United States Patent
Kitashou

(10) Patent No.: US 8,446,630 B2
(45) Date of Patent: May 21, 2013

(54) OUTPUT CONTROL APPARATUS, ITS CONTROL METHOD, AND COMPUTER-READABLE STORAGE MEDIUM

(75) Inventor: Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/779,812

(22) Filed: May 13, 2010

(65) Prior Publication Data

US 2010/0302583 A1 Dec. 2, 2010

(30) Foreign Application Priority Data

Jun. 1, 2009 (JP) ................................. 2009-132469

(51) Int. Cl.
*G06K 15/00* (2006.01)
*G03G 15/00* (2006.01)
*G06F 3/041* (2006.01)
*G06F 3/12* (2006.01)

(52) U.S. Cl.
USPC .......... 358/1.18; 358/1.15; 399/108; 345/173

(58) Field of Classification Search
USPC .................. 358/1.15, 1.18; 399/108; 345/173
See application file for complete search history.

(56) References Cited

U.S. PATENT DOCUMENTS

| | | | |
|---|---|---|---|
| 6,784,906 B2 * | 8/2004 | Long et al. ..................... | 347/171 |
| 7,479,950 B2 * | 1/2009 | Dehlin et al. .................. | 345/173 |
| 2008/0025755 A1 * | 1/2008 | You ............................... | 399/108 |

FOREIGN PATENT DOCUMENTS

JP 2004-041740 A 2/2004

OTHER PUBLICATIONS

Derene, Glenn. "Microsoft Surface: Behind-the-Scenes First Look (with Video)", published Jul. 1, 2007 and accessed from http://www.popularmechanics.com/technology/gadgets/news/4217348.*
Olsen, Stefanie. "For travelers, Microsoft 'Surfaces' in Sheraton hotels", published Aug. 13, 2008 and accessed from http://news.cnet.com/8301-10805_3-10016573-75.html.*
"Physical Features of a Microsoft Surface Unit", accessed from http://technet.microsoft.com/en-us/library/ee692114%28v=surface.10%29.aspx.*

* cited by examiner

*Primary Examiner* — Twyler Haskins
*Assistant Examiner* — Fred Guillermety
(74) *Attorney, Agent, or Firm* — Canon U.S.A., Inc. IP Division

(57) ABSTRACT

An output control apparatus which performs output control of data displayed on a display unit includes a detection unit configured to detect an output apparatus located near the display unit, an acquisition unit configured to acquire arrangement position information indicating an arrangement position of the output apparatus, a determination unit configured to determine an output layout of the data according to a relationship between the arrangement position of the output apparatus indicated by the arrangement position information and a display position of the data displayed on the display unit, and a control unit configured to perform control to output the data from the output apparatus with the output layout determined by the determination unit.

7 Claims, 9 Drawing Sheets

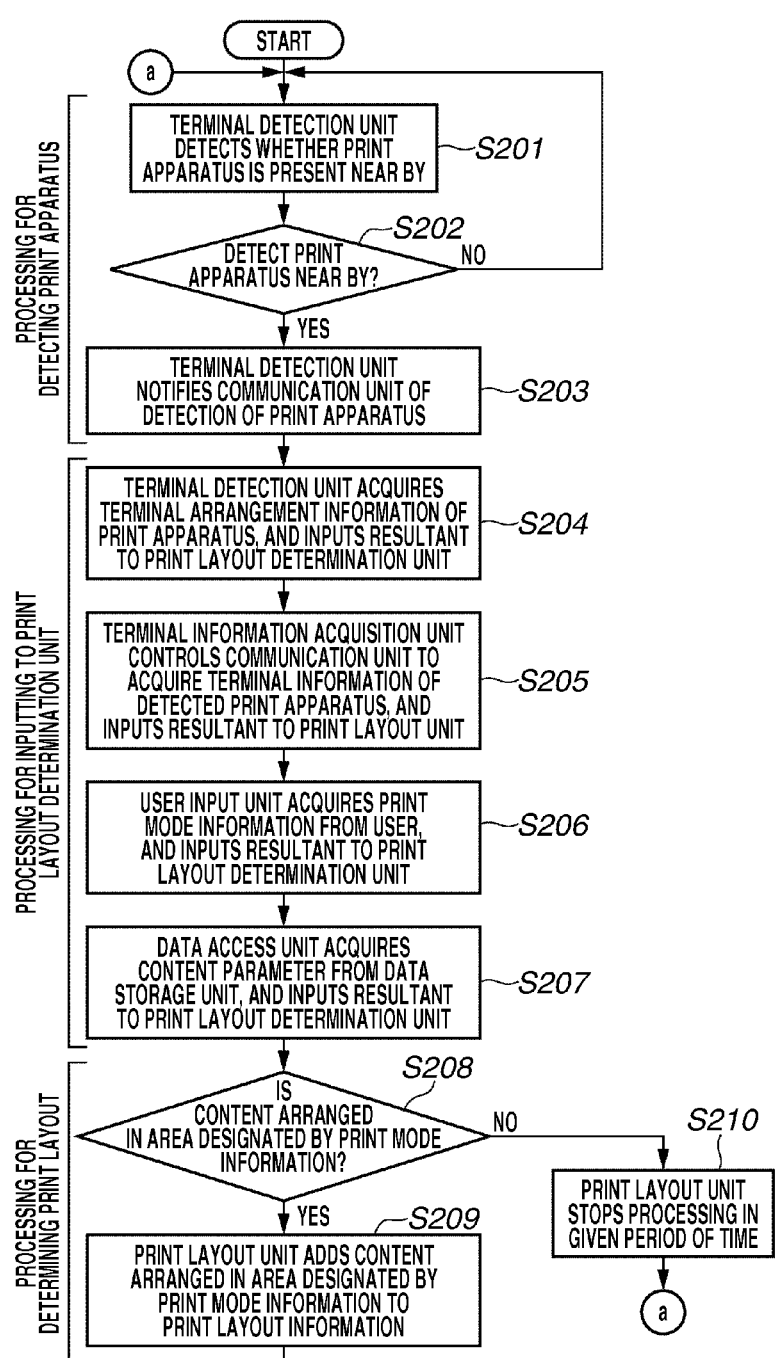

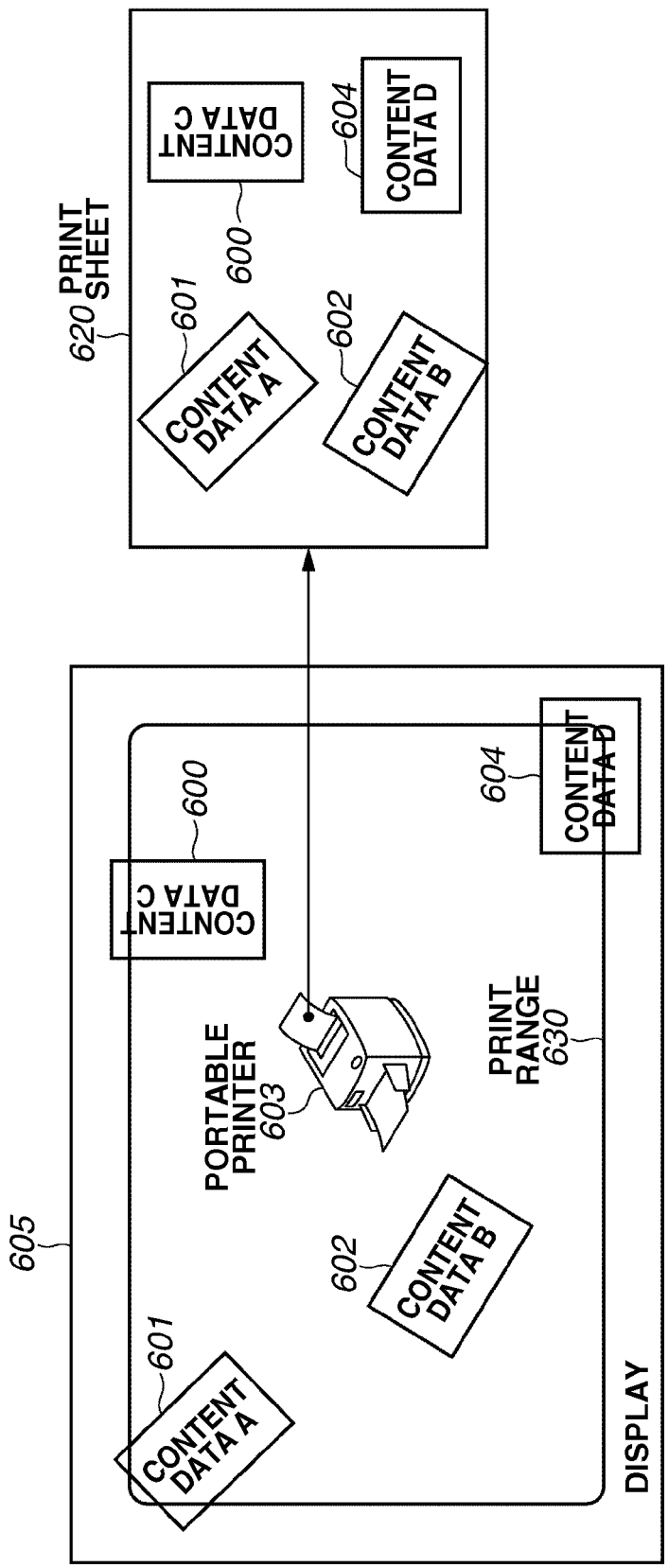

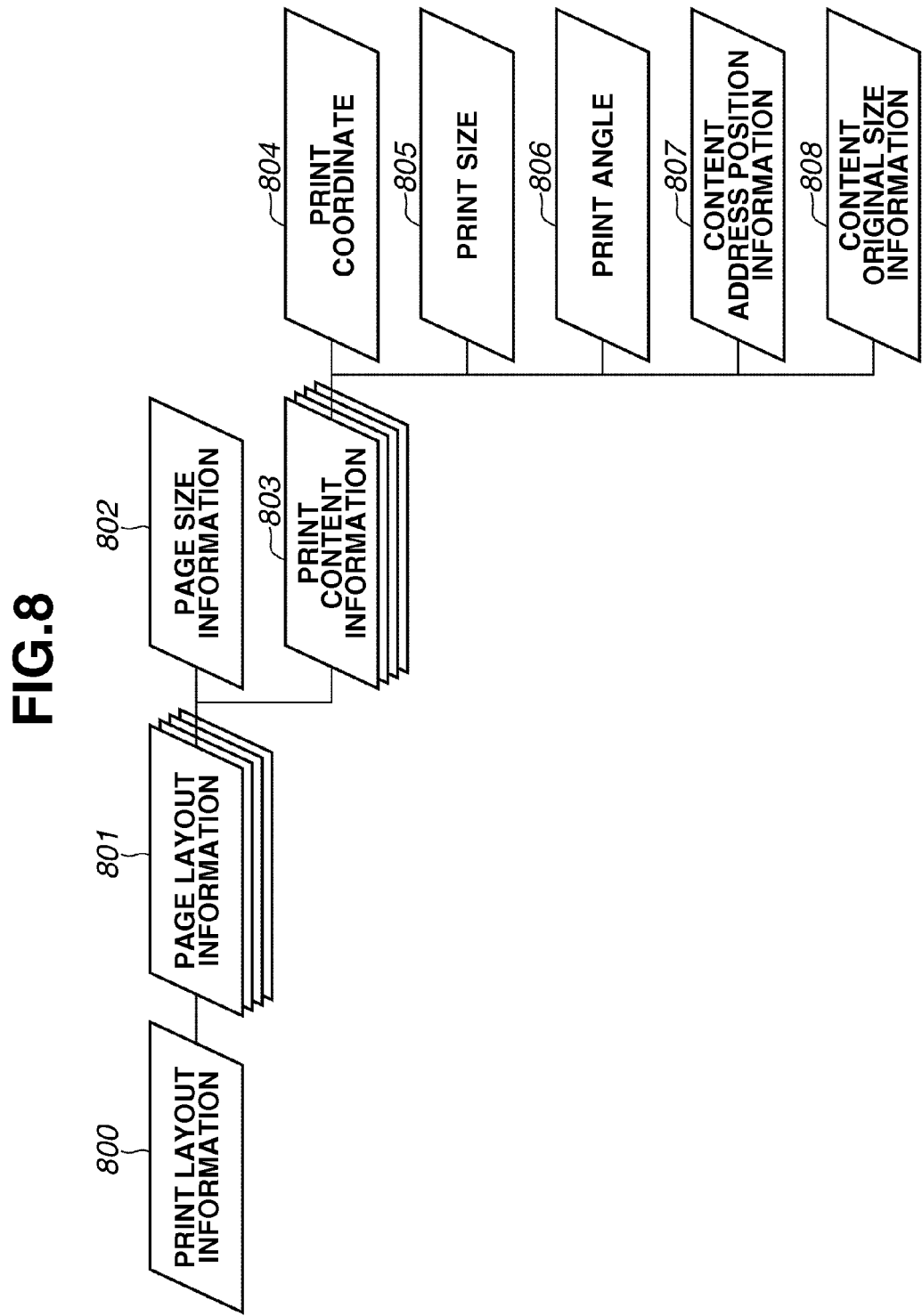

OUTPUT CONTROL APPARATUS, ITS CONTROL METHOD, AND COMPUTER-READABLE STORAGE MEDIUM

BACKGROUND OF THE INVENTION

1. Field of the Invention

The present invention relates to a technique of executing an output control of data displayed on a display unit.

2. Description of the Related Art

Recently, a system is realized in which a personal digital assistant is brought into contact with a table-type display to make a data communication between the personal digital assistant and a position of the table-type display on which contacts with the personal digital assistant. In the system described above, arrangement of content data at an arbitrary position on the table-type display can be realized by a physical operation of bringing the personal digital assistant into contact with the arbitrary position on the table-type display. Further, acquisition of the content data arranged at the arbitrary position on the table-type display by the personal digital assistant can be realized by the physical operation of bringing the personal digital assistant into contact with the optional position on the table-type display.

Conventionally, a user operates the personal digital assistant or a user interface on the table-type display to perform control. On the other hand, the control described above includes an effect of providing an easy-to-understand and easy-to-operate operation to a user.

Japanese Patent Application Laid-Open No. 2004-41740 discusses a card game apparatus in which a user can arrange integrated circuit (IC) cards on a terminal apparatus that detects a position and a direction of the IC card and can designate a position and a formation of an object corresponding to respective IC cards.

In the conventional example described above, the object which can be arranged on the table-type display as being contact therewith is not limited to a personal digital assistant that can perform general-purpose computing processing, and personal digital assistants, such as a printer, that can perform special processing are also effective. For example, there is supposed a case in which a commercially available portable handy printer is placed on the table-type display to print a content object arranged on the table-type display.

In this example, arbitrary contents arranged on the table-type display can easily be selected as described above. However, the printer includes a plurality of set parameters such as a print layout and a number of printing sheets involved with the printing. A user has to operate a user interface to set these print parameters. In the case of using the table-type display, it is supposed that there is a plurality of users. When the plurality of users performs an operation of setting the print parameters, it is considered that the operation becomes more complicated.

SUMMARY OF THE INVENTION

The present invention is directed to facilitate an operation of setting an output layout, which is conventionally troublesome, in an output apparatus.

According to an aspect of the present invention, an output control apparatus which performs output control of data displayed on a display unit includes a detection unit configured to detect an output apparatus located near the display unit, an acquisition unit configured to acquire arrangement position information indicating an arrangement position of the output apparatus, a determination unit configured to determine an output layout of the data according to a relationship between the arrangement position of the output apparatus indicated by the arrangement position information and a display position of the data displayed on the display unit, and a control unit configured to performs control to output the data from the output apparatus with the output layout determined by the determination unit.

In the present invention, an output layout of data is determined according to a positional relationship between a display position of the data displayed on a display unit and an arrangement position of the output apparatus. Therefore, according to the present invention, it can be facilitate an operation of setting an output layout, which is conventionally troublesome, in an output apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example realized by an exemplary embodiment of the present invention.

FIG. 8 illustrates a structure of print layout information.

DESCRIPTION OF THE EMBODIMENTS

Figure 1:
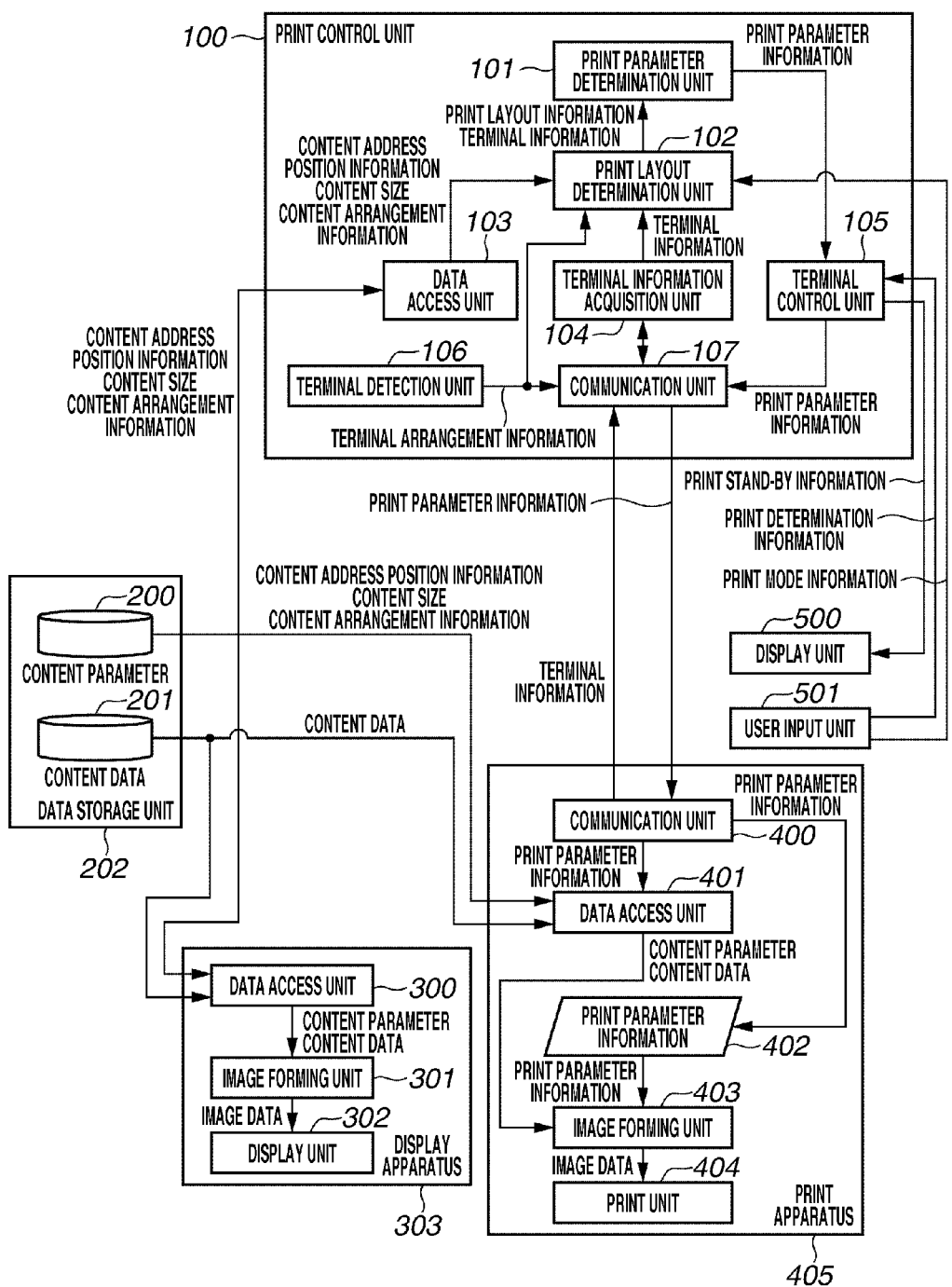
FIG. 1 is block diagram illustrating a configuration of an essential part of a print system according to an exemplary embodiment of the present invention.

Various exemplary embodiments, features, and aspects of the invention will be described in detail below with reference to the drawings.

The components illustrated in the exemplary embodiment below are only illustrative, and the present invention is not limited to the configuration illustrated in the drawings.

FIG. 1 is a block diagram illustrating a configuration of an essential part of a print system according to the exemplary embodiment of the present invention. As illustrated in FIG. 1, the print system according to the present exemplary embodiment includes a print control unit 100, a data storage unit 202, a display apparatus 303, a print apparatus 405, a display unit 500, and a user input unit 501.

The print control unit 100 includes each unit illustrated in FIG. 1. In the present exemplary embodiment, it is supposed that a terminal detection unit 106 and a communication unit 107 are mounted by an analog wireless communication circuit and a hardware logic circuit, and the other units 101 to 105 are mounted to a firmware on a processor. The print control unit 100 includes a memory or a peripheral circuit such as an input-output (IO) circuit, but they are not illustrated in FIG. 1, since they are not so important.

The data storage unit 202 stores content parameters 200 and content data pieces 201 of the respective contents displayed on the display apparatus 303. In the present exemplary embodiment, it is supposed that the data storage unit 202 is mounted with a memory.

The content parameter 200 is header information of each of the content, and includes content address position information, a content size, and content arrangement information.

The content data 201 is a data piece of each of the content. For example, when the content is an image, the content data 201 stores image data, while when the content is a video image, it stores video image stream data. The content data 201 is an example of data according to the exemplary embodiment of the present invention.

The display apparatus 303 is a device to display the content data 201. The display apparatus 303 includes a data access unit 300, an image forming unit 301, and a display unit 302. The display apparatus 303 is an example of a display unit in the exemplary embodiment of the present invention.

The data access unit 300 is configured to make a data access to the data storage unit 202. The data access unit 300 acquires the content parameter 200 and the content data 201 from the data storage unit 202, and inputs the content parameter 200 and the content data 201 as acquired to the image forming unit 301.

The image forming unit 301 arranges the content data 201 as designated by the content parameter 200 to generate image data to be displayed.

Then, the image forming unit 301 inputs the image data to the display unit 302. The display unit 302 displays the image data to present the same to a user.

The print apparatus 405 is a device to print the content data 201. The print apparatus 405 includes a communication unit 400, a data access unit 401, an image forming unit 403, and a print unit 404. The print apparatus 405 also has a function of storing print parameter information 402.

The communication unit 400 is a mechanism to perform wireless communication with the print control unit 100. The communication unit 400 acquires print parameter information, and transmits terminal information. After acquiring the print parameter information, the communication unit 400 inputs the print parameter information to the data access unit 401 and to a function of storing the print parameter information 402.

The data access unit 401 is a function to perform data access with the data storage unit 202. The data access unit 401 acquires the content parameter 200 and the content data 201 from the data storage unit 202, and inputs the image content parameter 200 and the content data 201 as acquired to the image forming unit 403.

The function of storing the print parameter information 402 stores the input print parameter information, and inputs the print parameter information to the image forming unit 403.

The image forming unit 403 includes a function of generating the image data to be printed. The image forming unit 403 generates the image data in which the content parameter 200 and the content data 201 are arranged as designated by the print parameter information, and inputs the image data to the print unit 404.

The print unit 404 prints the input image data onto a print sheet. The display unit 500 is mounted with a display apparatus and a peripheral circuit, and has a function of presenting print stand-by information input from the print control unit 100 to the user.

The user input unit 501 has a function of receiving input from the user, and of inputting print determining information and print mode information to the print control unit 100.

Figure 2B:
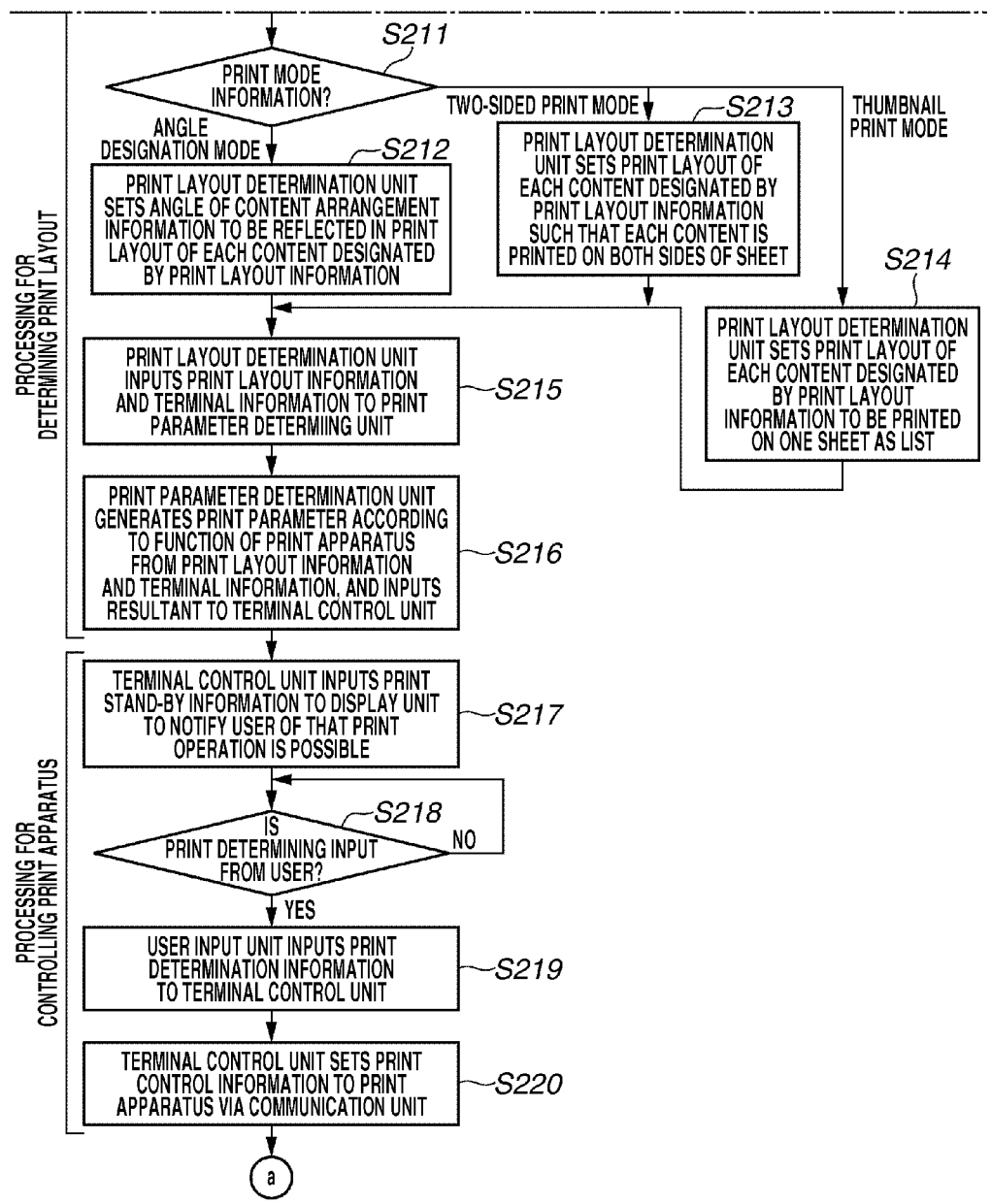
FIG. 2 is a flowchart illustrating a flow of a process of a print control unit.

Processing executed by the print control unit 100 will next be described. The description below also includes the description of the respective functional configurations in the print control unit 100. FIG. 2 is a flowchart illustrating the flow of processing in the print control unit 100.

In FIG. 2, in steps S201 and S202, the terminal detection unit 106 detects by the wireless communication whether the print apparatus 405 is present near the terminal detection unit 106. When the terminal detection unit 106 can detect the print apparatus 405 near the terminal detection unit 106 (display apparatus 303) (YES in step S202), then in step S203, the terminal detection unit 106 notifies the communication unit 107 of detection of the print apparatus 405. On the other hand, when the terminal detection unit 106 cannot detect the print apparatus 405 near the terminal detection unit 106 (NO in step S202), the terminal detection unit 106 continues to detect the presence of the print apparatus 405. The steps S201 and S202 are examples of the processing of a detection unit in the exemplary embodiment of the present invention.

In step S204, the terminal detection unit 106 acquires terminal arrangement information of the detected print apparatus 405, and inputs the terminal arrangement information to the print layout determination unit 102. The terminal arrangement information is physical coordinate information on the display apparatus 303 on which the print apparatus 405 is arranged. The terminal arrangement information includes arrangement coordinates, an arrangement area, and an arrangement direction. The terminal arrangement information is an example of arrangement position information in the present invention. The step S204 is an example of processing of an acquisition unit in the present invention.

Then in step S205, the communication unit 107 notifies the terminal information acquisition unit 104 of the presence of the print apparatus 405 and starts the terminal information acquisition unit 104. The terminal information acquisition unit 104 controls the communication unit 107 to acquire terminal information of the print apparatus 405, and inputs the acquired terminal information to the print layout determination unit 102. The terminal information includes a print function of the detected print apparatus 405.

Next, in step S206, the user input unit 501 acquires print mode information designated by the user, and inputs the acquired print mode information to the print layout determination unit 102. The print mode information designates which mode is to be executed from the print modes realized by the print apparatus 405. In the present exemplary embodiment, the print mode information includes an angle designation mode, a two-sided print mode, a thumbnail print mode, and print range information. The print mode information is an example of output mode information in the present invention. The step S206 is an example of processing of an output mode input unit in the present invention.

In step S207, the data access unit 103 acquires the content parameter 200 from the data storage unit 202, and inputs the acquired content parameter 200 to the print layout determination unit 102. The content parameter 200 is additional information of the content data 201 displayed on the display apparatus 303, and includes content address position information, a content size, and content arrangement information. Thus, input of the information to the print layout determination unit 102 is completed. The order of the input of the respective information pieces is only one example, and the order is not necessarily limited to the order described above.

The print layout determination unit 102 receives input of the above described terminal arrangement information, terminal information, print mode information, and content parameter 200 to determine the print layout of each piece of the content data 201. More specifically, in step S208, the print layout determination unit 102 refers to the print range information in the print mode information to determine whether the content data 201 is arranged in the print range on the display apparatus 303 designated by the print range information.

When the content data is not arranged in the print range (NO in step S208), then in step S210, the print layout determination unit 102 stops its processing for a given period of time in order not to continuously loop the processing, and then, returns to the detecting processing at the terminal detection unit 106 in the step S201. On the other hand, when the content data 201 is arranged (YES in step S208), then in step S209, the print layout determination unit 102 adds the information of the content data 201 arranged in the print range designated by the print range information to the print layout information. More specifically, in the step S209, the print layout determination unit 102 refers to the print range information that indicates the (print range) output range of the content data with reference to the arrangement position of the print apparatus 405. The print layout determination unit 102 executes processing for determining a print layout (output layout) in which the content data arranged in the print range (output range) designated by the print range information is to be output. The step S209 is an example of processing of a determination unit in the exemplary embodiment of the present invention. The processing for inputting the print mode information including the print range information is an example of processing of a range inputting unit in the present invention.

FIG. 8 illustrates a configuration of the print layout information 800. The print layout information 800 is a set of data pieces relating to the arrangement of the content data on a print sheet, and includes a plurality of page layout information pieces 801 that are a set of layout information pieces per page unit.

Each piece of the page layout information 801 includes page size information 802 for designating a size of a print sheet, and a plurality of print content information pieces 803 for designating the layout of the content data arranged on the print sheet.

Each piece of the print content information 803 includes print coordinates 804 indicating the arrangement coordinates of the corresponding content data on the print sheet, a print size 805 indicating the arrangement size, a print angle 806 indicating the arrangement angle, content address position information 807 indicating a memory address in which the corresponding content data is stored on the data storage unit 202, and content original size information 808 indicating an original size of the corresponding content data.

Returning to the description of FIG. 2, in step S211, the print layout determination unit 102 then refers to the print mode information to determine whether the print mode information is the angle designation mode, the two-sided print mode, or the thumbnail print mode.

When the print mode information designates the angle designation mode, in step S212, the print layout determination unit 102 sets the print angle 806 in the print layout information 800 of each piece of the content data 201 designated by the print layout information to reflect an angle of the content arrangement information.

When the print mode information designates the two-sided print mode, in step S213, the print layout determination unit 102 sets such that the page layout information 801 in the print layout information 800 becomes a two-sided printing.

When the print mode information designates the thumbnail print mode, in step S214, the print layout determination unit 102 sets the print coordinate 804 and the print size 805 in the print layout information 800 such that all content data pieces 201 which are to be printed are arranged within one print sheet.

Thus, in step S215, the print layout determination unit 102 generates the print layout information 800, and inputs the print layout information 800 and the terminal information to the print parameter determination unit 101.

In step S216, the print parameter determination unit 101 generates set data to the print apparatus 405 based on the input print layout information 800 and the terminal information. More specifically, the print parameter determination unit 101 generates the print parameter information which is a set value of a device in the print apparatus 405, in such a manner that the print layout designated by the print layout information 800 is realized in the print apparatus 405 designated by the terminal information. The print parameter information specifically indicates setting information of a control register and a control memory included in the print apparatus 405. Next, the print parameter determination unit 101 inputs the print parameter information to the terminal control unit 105.

In step S217, after the print parameter information is input, the terminal control unit 105 inputs the print stand-by information which indicates that the print operation is possible to the display unit 500. Accordingly, the condition in which the print control unit 100 is in the print stand-by state is notified the user.

Then, in step S218, the terminal control unit 105 determines whether the user input determination of printing, and becomes in a state of waiting the authorization of the user. When the user confirms the display unit 500 and inputs determination of printing (YES in step S218), then in step S219, the user input unit 501 inputs the print determining information to the terminal control unit 105. On the other hand, when the user does not input determination of printing (NO in step S218), the processing returns to step S218.

Subsequent to the step S219, the terminal control unit 105 sets the print parameter information to the print apparatus 405 via the communication unit 107 in step S220. Thus, a series of the processing flow of the print control unit 100 is completed.

Figure 3:
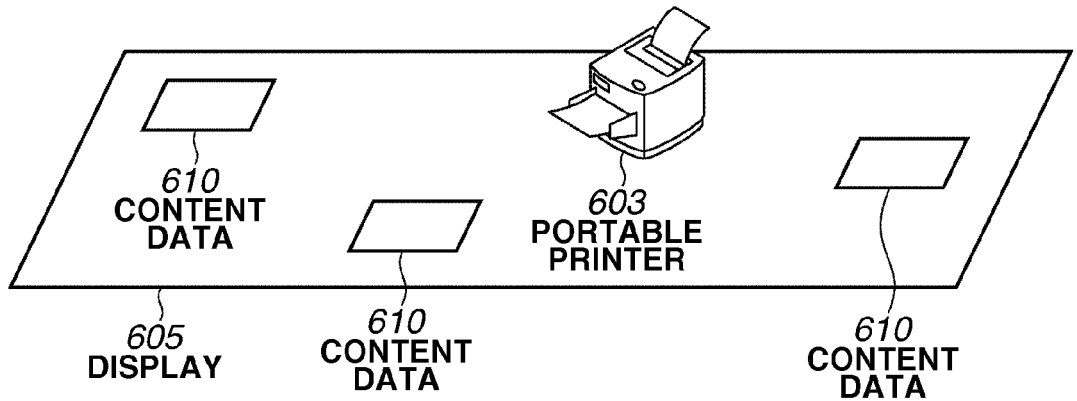
FIG. 3 illustrates an example realized by an exemplary embodiment of the present invention.

Subsequently, examples of execution of the processing realized by the present exemplary embodiment will be described with reference to FIGS. 3 to 7. FIG. 3 illustrates an example of use of the present exemplary embodiment. A plurality of content data pieces 610 are displayed on a table-type display 605, and a portable printer 603 is placed onto the table-type display 605. FIGS. 4, 5, 6, and 7 illustrate that the table-type display 605 when viewed from the top.

The print control unit 100, the data storage unit 202, the display apparatus 303, the display unit 500, and the user input unit 501 illustrated in FIG. 1 are the components provided to the table-type display 605. The print apparatus 504 in FIG. 1 corresponds to the portable printer 603. The table-type display 605 is an example of an output control apparatus in the present invention, and the portable printer 603 is an example of an output apparatus in the present invention.

Figure 4:
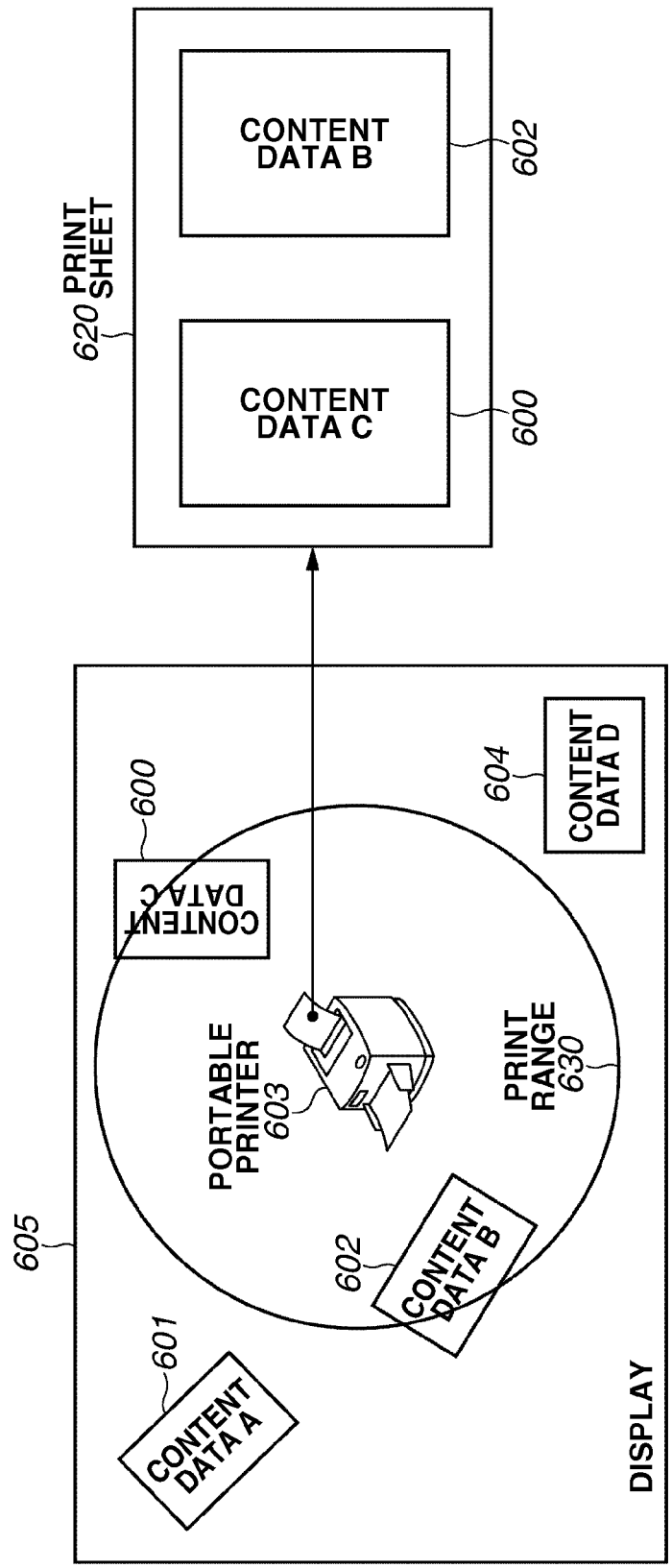
FIG. 4 illustrates an example realized by an exemplary embodiment of the present invention.

In the example of the execution illustrated in FIG. 4, a range in a fixed distance from the portable printer 603 is set to a print range 630, and the content data C 600 and the content data B 602 within this range are defined as objects to be printed.

The portable printer 603 prints and outputs the two content data pieces on one surface with the thumbnail print mode as illustrated by a print sheet 620 in FIG. 4. In this example, the user places the portable printer 603 near the content data which the user intends to print, by which the setting operation of the print parameter, which is conventionally needed, is reduced.

Figure 5:
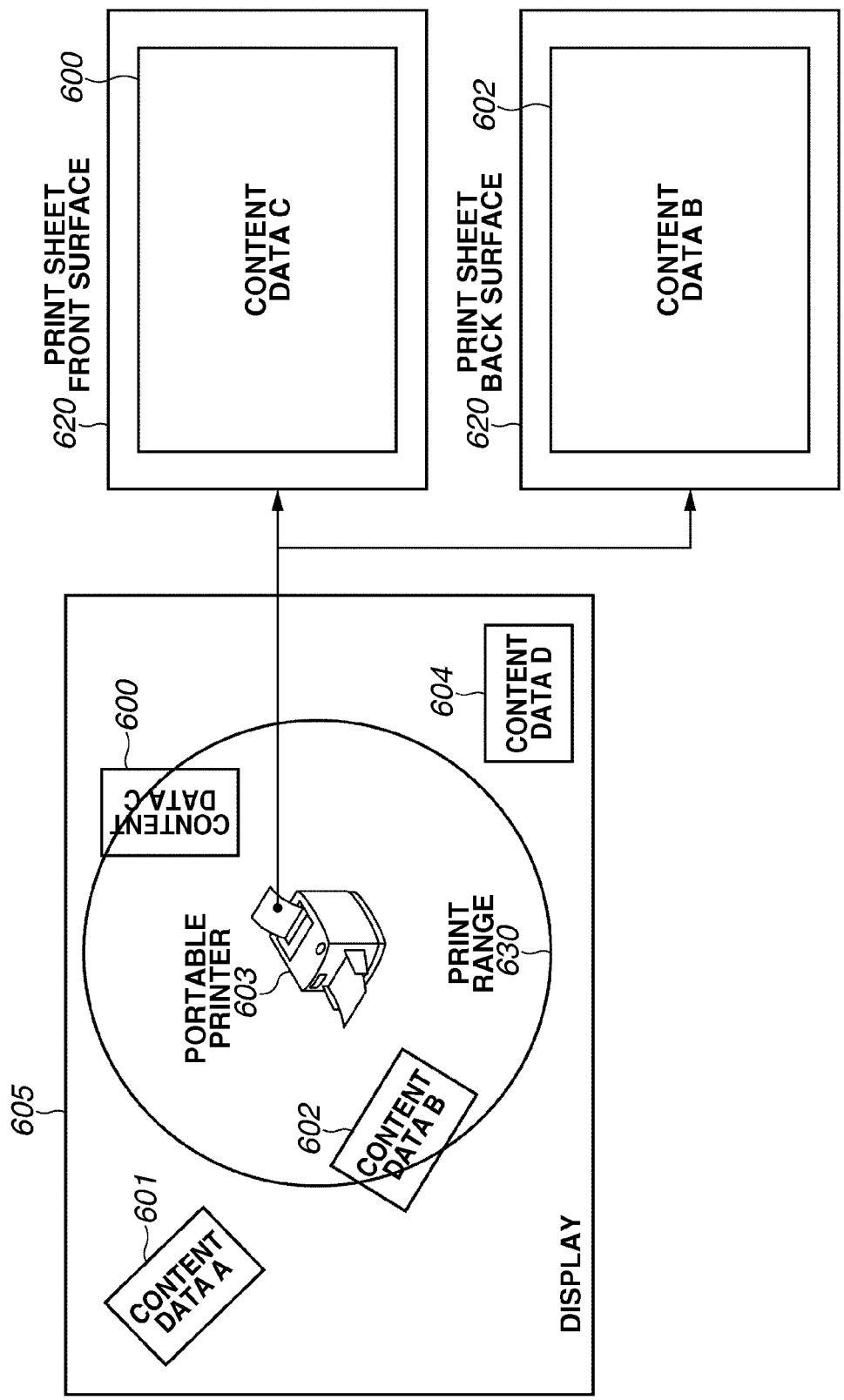
FIG. 5 illustrates an example realized by an exemplary embodiment of the present invention.

The example of the execution in FIG. 5 illustrates the case in which the print mode is the two-sided print mode. In this example, the content data C 600 and the content data B 602 that are within the range in the fixed distance from the arrangement position of the portable printer 603 are printed respectively on a front surface and a back surface of the print sheet 620.

Figure 6:
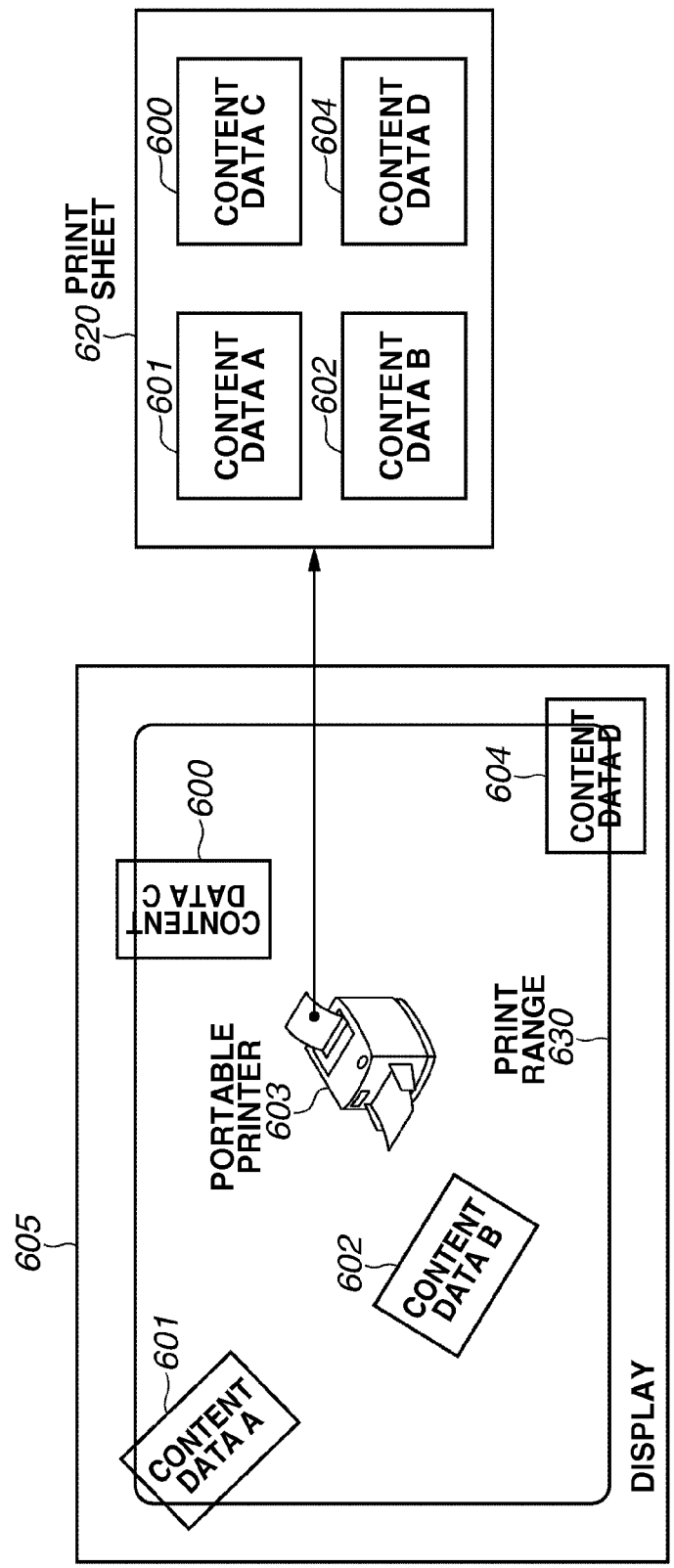
FIG. 6 illustrates an example realized by an exemplary embodiment of the present invention.

The example of the execution in FIG. 6 illustrates the case in which a shape and a size of the print range 630 of the portable printer 603 are changed. In this example, the print range has a rectangular shape, and the print range size is the entire area of the table-type display 605. As a result, the content data A 601, content data C 600, content data B 602, and content data D 604 are printed on one surface of the print sheet 620 with the thumbnail print mode.

The example of the execution in FIG. 7 illustrates the case in which the print mode of the portable printer 603 is the mode in which the respective content data pieces are printed with the display angle thereof being reflected. When the portable printer 603 prints the contents displayed on the table-type display 605 in this example, it is controlled such that the content are printed to reflect the display angle of each of the contents. For example, the content data D 604, which is arranged in parallel to the display 605, is printed to be parallel to the print sheet 620. The content data A 601 arranged with an arbitrary angle to the display 605 is printed with the arbitrary angle to the print sheet 620.

The shape or the size of the print range 630 and the combination of the print modes are not limited to those described in the exemplary embodiment. Arbitrary combinations of these may be employed.

In the exemplary embodiment described above, the layout in the print apparatus 405 is automatically determined from the positional relationship between the content displayed on the display apparatus 303 and the print apparatus 405 arranged on the display apparatus 303. Thus, the operation of setting the layout in the print apparatus 405, which is troublesome, can be facilitated.

The units and steps constituting the exemplary embodiment of the present invention can be realized by the operation of a program stored in a random access memory (RAM) or a read-only memory (ROM) of a computer. The program and a computer-readable storage medium storing the program are included in the present invention.

The present invention may be embodied as a system, apparatus, method, program, or recording medium. More specifically, the present invention may be applied to an apparatus including only one device.

The present invention may be embodied as the case in which a program of software realizing the functions of the above described exemplary embodiment directly or remotely to a system or an apparatus. The supplied program code can be read and executed by the computer in the system or the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-132469 filed Jun. 1, 2009, which is hereby incorporated by reference herein in its entirety.

What is claimed is:

1. An output control apparatus which performs output control of data displayed on a display unit, the output control apparatus comprising:
   a detection unit configured to detect an output apparatus located near the display unit;
   an acquisition unit configured to acquire arrangement position information indicating an arrangement position of the output apparatus;
   a determination unit configured to determine an output layout of the data according to a relationship between the arrangement position of the output apparatus indicated by the arrangement position information and a display position of the data displayed on the display unit; and
   a control unit configured to perform control to output the data from the output apparatus with the output layout determined by the determination unit.

2. The output control apparatus according to claim 1, further comprising:
   a range input unit configured to input range information indicating an output range of the data with reference to the arrangement position of the output apparatus,
   wherein the determination unit determines the output layout in which the data which is arranged in the output range indicated by the range information from the arrangement position of the output apparatus is set as an object to be output.

3. The output control apparatus according to claim 1, further comprising:
   an output mode input unit configured to input output mode information indicating an output mode of the data,
   wherein the determination unit determines the output layout for outputting the data in the output mode indicated by the output mode information.

4. The output control apparatus according to claim 3, wherein the output mode indicated by the output mode information includes at least one of a mode of outputting the data in a form of a thumbnail on a sheet, a mode of outputting the data on both surfaces of a sheet, and a mode of outputting the data on a sheet by reflecting a display angle of the data on the display unit.

5. The output control apparatus according to claim 1, wherein the arrangement position information is information indicating a coordinate on the display unit on which the output apparatus is arranged.

6. A method for controlling an output control apparatus which performs output control of data displayed on a display unit, the method comprising:
   detecting an output apparatus located near the display unit;
   acquiring arrangement position information indicating an arrangement position of the output apparatus;
   determining an output layout of the data according to a relationship between the arrangement position of the output apparatus indicated by the arrangement position information and a display position of the data displayed on the display unit; and
   performing control to output the data from the output apparatus with the determined output layout.

7. A non-transitory computer-readable storage medium that stores a program which causes a computer to execute a method for controlling an output control apparatus which performs output control of data displayed on a display unit, the method comprising:

detecting an output apparatus located near the display unit;
acquiring arrangement position information indicating an arrangement position of the output apparatus;
determining an output layout of the data according to a relationship between the arrangement position of the output apparatus indicated by the arrangement position information and a display position of the data displayed on the display unit; and
performing control to output the data from the output apparatus with the determined output layout.

* * * * *